(12) United States Patent
Sawada (10) Patent No.: US 11,261,320 B2
(45) Date of Patent: Mar. 1, 2022

(54) INJECTION MOLDED ARTICLE AND SHOE

(71) Applicant: ASICS CORPORATION, Kobe (JP)

(72) Inventor: Daisuke Sawada, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 17/253,109

(22) PCT Filed: Aug. 6, 2019

(86) PCT No.: PCT/JP2019/030843
§ 371 (c)(1),
(2) Date: Dec. 16, 2020

(87) PCT Pub. No.: WO2021/024369
PCT Pub. Date: Feb. 11, 2021

(65) Prior Publication Data
US 2021/0214546 A1 Jul. 15, 2021

(51) Int. Cl.
*C08L 53/00* (2006.01)

(52) U.S. Cl.
CPC ......... *C08L 53/00* (2013.01); *C08L 2205/025* (2013.01); *C08L 2205/03* (2013.01); *C08L 2207/04* (2013.01)

(58) Field of Classification Search
CPC ......... C08L 53/025; C08L 91/00; A43B 1/007
See application file for complete search history.

(56) References Cited

U.S. PATENT DOCUMENTS

| | | | | |
|---|---|---|---|---|
| 3,945,977 A | * | 3/1976 | Snavely | C08K 3/04 524/534 |
| 2002/0160137 A1 | * | 10/2002 | Varma | C08L 53/02 428/35.7 |
| 2005/0272849 A1 | * | 12/2005 | Clair | C08L 53/02 524/474 |
| 2018/0368525 A1 | | 12/2018 | Iuchi et al. | |

FOREIGN PATENT DOCUMENTS

| | | |
|---|---|---|
| EP | 0614945 A2 | 9/1994 |
| JP | H0711083 A | 1/1995 |
| JP | 5966110 B1 | 8/2016 |
| JP | 2018042908 A | 3/2018 |
| JP | 2019005387 A | 1/2019 |
| WO | 2017051473 A1 | 3/2017 |

* cited by examiner

*Primary Examiner* — Mark S Kaucher
(74) *Attorney, Agent, or Firm* — Studebaker & Brackett PC (57) ABSTRACT

In order to provide an injection molded article that is able to be easily produced so that a molding surface of a forming mold is accurately reflected on the injection molded article, and, in order to provide a shoe having a shoe part excellent in appearance, the shoe part is formed of an elastomer composition showing a certain heat melting characteristics.

15 Claims, 6 Drawing Sheets

INJECTION MOLDED ARTICLE AND SHOE

FIELD

The present invention relates to an injection molded article and a shoe.

BACKGROUND

Sports products used for various sports competitions each are composed of various parts. For example, a shoe is generally composed of, in addition to main parts such as a sole and an upper, a reinforcement part composed of a hard resin composition, a cushioning part composed of a soft elastomer composition, or the like. As the elastomer composition used in forming the cushioning part, a composition including a plasticizer in addition to an elastomer is known. In general, the plasticity of the elastomer composition of this type is adjusted by adjusting the content of the plasticizer.

Regarding shoe parts composed of the elastomer composition, Patent Literature 1 below discloses that a cushioning part used for a shoe is composed of the elastomer composition. More specifically, Patent Literature 1 below discloses that the cushioning part having excellent transparency and abrasion resistance is formed of the elastomer composition including a styrene-based thermoplastic elastomer.

Meanwhile, parts formed of the elastomer composition used for shoe parts or the like may be produced by injection molding. In the injection molding, products are produced by injecting the elastomer composition in a heated and molten state into a cavity of a forming mold, the cavity having a shape corresponding to the shape of the product, followed by allowing the elastomer composition filled in the cavity to cool and set. The injection molded article thus obtained can be used to prepare products having a complex shape only by being subjected to a simple secondary processing such as deburring. Since shoe parts generally have complex shapes, such an injection molding method is suitable as a method for producing the shoe parts.

CITATION LIST

Patent Literature

Patent Literature 1: JP 5966110 B

SUMMARY

Technical Problem

In producing an injection molded article with an elastomer composition, the injection molded article sometimes fails to have a desired appearance because the conditions of a molding surface of a forming mold are sometimes not fully reflected in a surface of the injection molded article. For example, fine wrinkles may be generated on the surface of the injection molded article even in the case where the injection molding is performed using the forming mold having a smooth molding surface. Patent Literature 1 above describes that a cushioning part is formed of the elastomer composition having excellent transparency. However, even if the inside of the cushioning part has excellent transparency, such fine wrinkles generated on the surface of the cushioning part causes difficulty in observing that the cushioning part is sufficiently transparent. A conventional shoe including the injection molded articles as shoe parts has a problem that the shoe cannot easily include parts excellent in appearance. Such a problem may be caused not only in the case where the injection molded article is used as a shoe part, but also in the case where it is used in other applications. It is an object of the present invention to solve such a problem. That is, the object of the present invention is to provide an injection molded article that is easily produced to have a surface more accurately reflecting the conditions of the molding surface of the forming mold, and provide a shoe including a shoe part excellent in appearance.

Solution to Problem

As a result of diligent studies in order to solve the aforementioned problem, the present inventor has found that the melting characteristics of an elastomer composition causes generation of fine wrinkles on the surface of an injection molded article. The present inventor also found that it is effective to include an elastomer having a high-molecular weight in the elastomer composition to improve the retention capacity of a plasticizer in adjusting the melting characteristics of the elastomer composition. Subsequently, the present inventor has found that a styrene-based thermoplastic elastomer having a specific molecular weight is excellent in capacity of retaining the plasticizer, and the elastomer composition including the styrene-based thermoplastic elastomer exhibits the melting characteristics suitable for the injection molding under general heat conditions. The present inventor has thus finally achieved the present invention.

That is, the present invention provides an injection molded article composed of an elastomer composition comprising one or more styrene-based thermoplastic elastomers and a plasticizer, wherein the elastomer composition has a maximum value of viscosity obtained by dynamic viscoelasticity measurement at a temperature of 200° C. in a frequency range of from 1 Hz to 50 Hz being 10,000 Pa·s or less, the elastomer composition has a maximum value of loss tangent obtained by dynamic viscoelasticity measurement at 200° C. in a frequency range of from 1 Hz to 50 Hz being 1 or more, at least one of the one or more styrene-based thermoplastic elastomers of the elastomer composition is a block polymer that comprises a soft segment and hard segments at both terminals of the soft segment in a molecular structure, and the block polymer has a mass average molecular weight of 300,000 or more.

In order to solve the aforementioned problem, the present invention provides a shoe composed of a plurality of shoe parts, wherein at least one of the plurality of shoe parts is an injection molded article having the aforementioned configuration.

BRIEF DESCRIPTION OF DRAWINGS

FIG. 4 is a schematic view showing a method for molding a shoe part using the forming mold shown in FIG. 3A to FIG.

3C (i.e., a cross sectional view taken along the line and viewed in the direction of arrows IV-IV thereof in FIG. 3B).

DESCRIPTION OF EMBODIMENTS

An injection molded article of the present invention can be preferably used as a part of a sports product. Hereinafter, the present invention will be described by way of embodiments by taking, for example, the case where the injection molded article is used as a shoe part. Further, hereinafter, the description will be given for an embodiment by taking, for example, the case where the shoe part is arranged in a midsole of a shoe.

The following examples are provided to illustrate particular embodiments of the invention and the present invention is not limited to the examples in any manner. For example, the technical scope of the present invention should not be interpreted as being limited to the examples of the injection molded article in terms of the intended use (i.e., a shoe part), and the specific shape, the quantity, the size, and the various characteristic values in the intended use.

Figure 1:
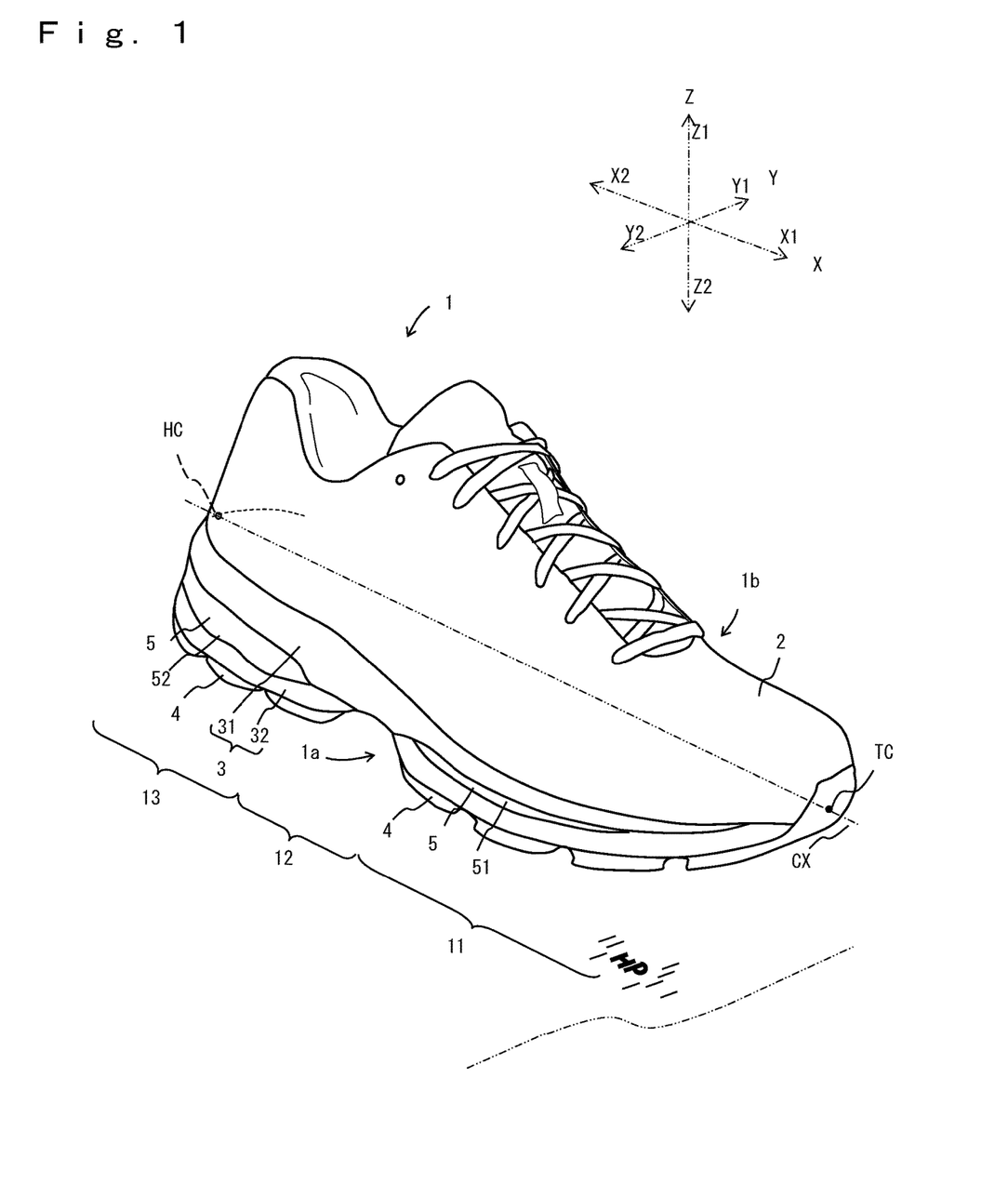
FIG. 1 is a schematic perspective view showing a shoe including a shoe part that is an injection molded article.

FIG. 1 shows a shoe formed using a shoe part of this embodiment. Hereinafter, when a description is given on the shoe shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

As shown in FIG. 1, the shoe 1 of this embodiment includes an upper 2 and a shoe sole. The shoe sole is composed of a plurality of shoe parts. The shoe 1 includes a midsole 3 and an outsole 4. The shoe 1 of this embodiment includes the outsole 4 in its bottommost position. The outsole 4 of this embodiment has, for example, a sheet shape, and is arranged in the bottommost position of the shoe 1 so that the thickness direction thereof corresponds to the vertical direction Z. The shoe 1 includes the midsole 3 between the outsole 4 and the upper 2 that covers a foot of a wearer from the upper side.

Figure 2:
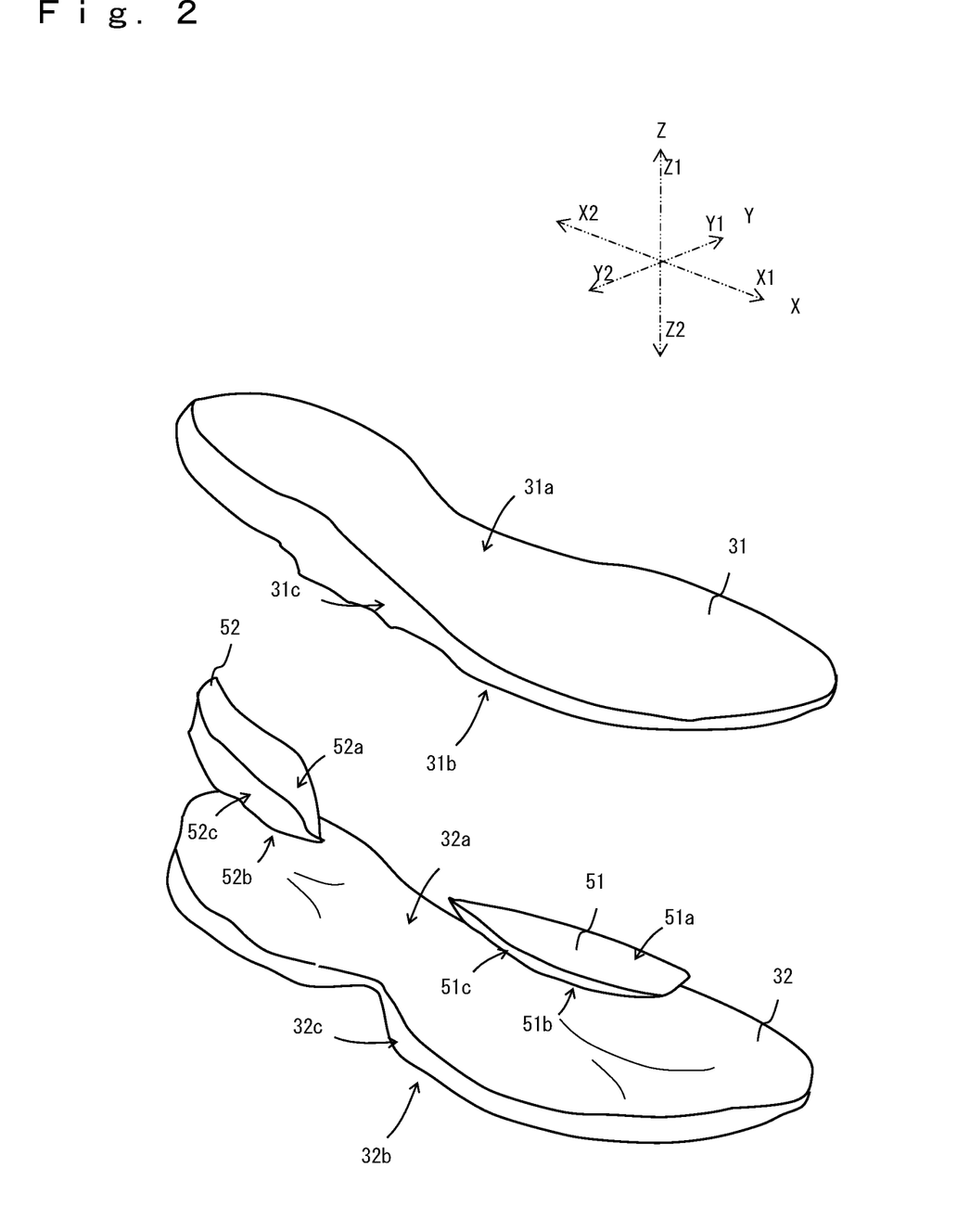
FIG. 2 is an exploded view of a shoe sole of the shoe shown in FIG. 1.

As shown in FIG. 2, the midsole 3 of this embodiment is, for example, separated into two upper and lower layers. Specifically, the shoe 1 of this embodiment includes a first midsole 31 that constitutes the upper layer of the two layers, and a second midsole 32 that constitutes the lower layer of the two layers. The outline shape of the first midsole 31 as viewed in the vertical direction corresponds to the outline shape of the second midsole 32, and they are vertically layered to have outer peripheral edges conforming to each other. The first midsole 31 has an upper surface 31a that is in contact with the upper 2 from below, and a lower surface 31b that is in contact with an upper surface of the second midsole 32. The second midsole 32 has a lower surface 32b that is in contact with the outsole 4 from above.

The shoe 1 of this embodiment includes, as shoe parts, two cushioning parts 5 sandwiched between the first midsole 31 and the second midsole 32. Each of the two cushioning parts 5 of this embodiment is an injection molded article, and as described later, is composed of an elastomer composition including a styrene-based thermoplastic elastomer and a plasticizer.

The size of each of the cushioning parts 5 as viewed in the vertical direction is smaller than the first midsole 31 and the second midsole 32. Accordingly, certain parts of the lower surface 31 of the first midsole 31 adhere to the cushioning parts 5 and the remaining part of the lower surface 31 adheres to the upper surface 32a of the second midsole 32.

One of the two cushioning parts 5 (hereinafter also referred to as "first cushioning part 51") is sandwiched between the first midsole 31 and the second midsole 32 in a forefoot portion 11 of the shoe. The other one of the two cushioning parts 5 (hereinafter also referred to as "second cushioning part 52") is sandwiched between the first midsole 31 and the second midsole 32 in a rear foot portion 13 of the shoe.

Each of the first cushioning part 51 and the second cushioning part 52 is arranged on the shoe sole to be partly exposed to the outside, and arranged to constitute a part of an outer peripheral surface of the shoe sole. The first cushioning part 51 has a side surface 51c constituting a part of the outer peripheral surface, an upper surface 51a spreading inward (in the direction Y1) from an upper edge of the side surface 51c, and a lower surface 51b spreading inward (in the direction Y1) from a lower edge of the side surface 51c. That is, the first cushioning part 51 has the upper surface 51a that is in contact with the lower surface 31b of the first midsole 31 from below, and the lower surface 51b that is in contact with the upper surface 32a of the second midsole 32 from above. In the same manner as the first cushioning part 51, the second cushioning part 52 has a side surface 52c constituting the outer peripheral surface, an upper surface 52a spreading inward (in the direction Y1) from an upper edge of the side surface 52c, and a lower surface 52b spreading inward (in the direction Y1) from a lower edge of the side surface 52c. That is, the second cushioning part 52 has the upper surface 52a that is in contact with the lower surface 31b of the first midsole 31 from below, and the lower surface 52b that is in contact with the upper surface 32a of the second midsole 32 from above.

As shown in FIG. 2, each of the first cushioning part 51 and the second cushioning part 52 has such a shape as to increase the thickness as it advances in the direction Y2 from the medial side to the lateral side. In other words, each of the first cushioning part 51 and the second cushioning part 52 has such a shape as to increase the thickness as it advances from the center of the shoe sole toward the outer peripheral surface, while decreasing the thickness as it advances from a lateral side surface 1a of the shoe 1 toward the center of the shoe 1. Each of the first cushioning part 51 and the second cushioning part 52 of this embodiment is configured not to cross the shoe 1 in the width direction and not to be observed from a medial side surface 1b of the shoe 1.

The first cushioning part 51 and the second cushioning part 52 of this embodiment are formed of an elastomer composition having excellent transparency. The same elastomer composition is used for the cushioning part 51 and the second cushioning part 52 in this embodiment, although there is no need that the elastomer composition for constituting the first cushioning part 51 must be the same as the elastomer composition for constituting the second cushioning part 52.

Each of the first cushioning part 51 and the second cushioning part 52 of this embodiment has a smooth surface and thus hardly causes irregular reflection of light on the surface. Each of the first cushioning part 51 and the second cushioning part 52 is an injection molded article produced by using a forming mold having a smooth molding surface without being subjected to hairline treatment or mat treatment as described later, so that the surface of the produced injection molded article reflects the smooth characteristics of the molding surface.

It is possible to see deep inside the first cushioning part 51 because the elastomer composition included as a constituent has transparency and a smooth surface. That is, the first cushioning part 51 in the shoe 1 of this embodiment is arranged to make it possible to see the inside of the first cushioning part 51 from the lateral side toward the medial side through the side surface 51c, thereby enabling a sense of depth to be perceived. The first cushioning part 51 has not only the smooth side surface 51c enabling easy visual observation of its inside, but also the smooth upper surface 51a and the smooth lower surface 51b, which also enable easy visual observation of the state of the lower surface 31b of the first midsole 31 and the state of the upper surface 32a of the second midsole 32 through the side surface 51c. The same applies to the second cushioning part 52 in terms of the aforementioned characteristics.

As seen from the above, according to the shoe 1 of this embodiment, in the case where the lower surface 31b of the first midsole 31 is imparted with a color tone or pattern different from those of the side surface 31c, or the upper surface 32a of the first midsole 31 is imparted with a color tone or pattern different from those of the side surface 32c, those color tones or patterns are allowed to be visible from the outside through the first cushioning part 51 and the second cushioning part 52.

The elastomer composition is not necessarily colorless and transparent, and may be colored transparent or opaque. However, in terms of exhibiting the aforementioned characteristics, for example, when a plate-shaped sample having a thickness of 4 mm prepared to have a sufficient smooth surface is produced, the plate-shaped sample preferably has such transparency that a total light transmittance of the plate-shaped sample is 60% or more. The total light transmittance of the plate-shaped sample is more preferably 70% or more, still more preferably 75% or more, particularly preferably 80% or more.

The elastomer composition preferably has such transparency that the haze of the plate-shaped sample (having a thickness of 4 mm) is 30% or less. The haze of the plate-shaped sample is more preferably 20% or less, still more preferably 15% or less, particularly preferably 10% or less.

In general, irregular reflection of light on the surfaces of the first cushioning part 51 and the second cushioning part 52 is larger than that of the plate-shaped sample. Thus, the haze value of each of the first cushioning part 51 or the second cushioning part 52 is larger than that of the plate-shaped sample. In other words, it can be said that the first cushioning part 51 and the second cushioning part 52 having a haze value approximate to that of the plate-shaped sample are more excellent in surface smoothness. Accordingly, it is preferable that the haze value measured by irradiating the light to the side surfaces (51c, 52c) of the first cushioning part 51 and the second cushioning part 52 exposed on the outer peripheral surface of the shoe sole be approximate to the haze value of the plate-shaped sample. The difference ($H_1 - H_0$) between the haze ($H_1$: %) measured for a sample prepared by slicing the first cushioning part 51 or the second cushioning part 52 to be oriented in parallel to the side surface (51c, 52c) and the haze ($H_0$: %) of the plate-shaped sample having the same thickness and a sufficiently smooth surface is preferably 30% or less. The difference in haze between the sample prepared by slicing the cushioning parts and the plate-shaped sample can be obtained based on the sample thickness of 4 mm. The difference ($H_1 - H_0$) is preferably 25% or less, more preferably 20% or less, still more preferably 10% or less.

The plate-shaped sample having a smooth surface can be prepared by, for example, after preparing a sheet body by the elastomer composition with a thickness slightly larger than the plate-shaped sample, followed by sandwiching the sheet body between mirror-finished metal plates and hot pressing them. As an alternative to such a method, the plate-shaped sample may be prepared by preparing two commercially available transparent resin films (for example, polyethylene terephthalate resin film having a thickness of 25 μm), followed by sandwiching the sheet body between the two resin films and hot pressing them. The sheet with the resin films integrated therewith may be used as a sample.

The total light transmittance can be measured by, for example, a method according to JIS K7361-1 "Plastics-Determination of the total luminous transmittance of transparent materials". The haze can be measured by, for example, a method according to JIS K-7136 "Plastics-Determination of haze for transparent materials". More specifically, the total light transmittance and the haze can be measured by an instrument such as a turbidimeter (for example, product name "NDH2000" manufactured by Nippon Denshoku Industries Co., Ltd.).

In order to enable the first cushioning part 51 and the second cushioning part 52 to exhibit excellent cushioning performance, the Asker C hardness (instantaneous value at 23° C.) of the elastomer composition is preferably 40 or less, more preferably 35 or less, still more preferably 30 or less. The Asker C hardness of the elastomer composition can be measured using an Asker C hardness meter according to JIS K7312.

In order to enable the first cushioning part 51 and the second cushioning part 52 to exhibit excellent strength, the tensile strength of the elastomer composition is preferably 0.5 MPa or more, more preferably 1 MPa or more, still more preferably 2 MPa or more. In general, the tensile strength of the elastomer composition is 5 MPa or less. The tensile strength of the elastomer composition can be obtained according to JIS K6251 "Rubber, vulcanized or thermoplastics-Determination of tensile stress-strain properties" and measured using, for example, a No. 2 dumbbell-type specimen stipulated in this standard.

In order to enable the first cushioning part 51 and the second cushioning part 52 to exhibit excellent strength, the tear strength of the elastomer composition is preferably 3 N/mm or more, more preferably 4 N/mm or more. In general, the tear strength of the elastomer composition is 10 N/mm or less. The tear strength of the elastomer composition can be obtained according to JIS K6251-1 "Rubber, vulcanized or thermoplastic-Determination of tear strength—Part 1: Trouser, angle and crescent test pieces" and measured using, for example, an angle test piece (no cutout) stipulated in this standard.

The elastomer composition that exhibits the aforementioned characteristics preferably shows a certain value of a complex viscosity obtained by dynamic viscoelasticity measurement at a temperature of 200° C. In the injection molding, the lower the complex viscosity is, the easier the elastomer composition spreads into every corner of the cavity. The maximum value ($\eta_{max}$) of the complex viscosity of the elastomer composition in the frequency range of from 1 Hz to 50 Hz is preferably 10,000 Pa·s or less. The maximum value ($\eta_{max}$) of the complex viscosity in the frequency range of from 1 Hz to 50 Hz is more preferably 5,000 Pa·s or less, still more preferably 2,000 Pa·s or less, particularly preferably 1,000 Pa·s or less.

The elastomer composition of this embodiment includes a plasticizer. In order to suppress bleeding out of the plasticizer from the first cushioning part 51 and the second cushioning part 52, the elastomer composition of this embodiment includes an elastomer having a large mass average molecular weight. Accordingly, it is difficult to make the complex viscosity of the elastomer composition excessively small. Also in order to prevent entrainment of air bubbles during the injection molding, the elastomer composition preferably has a complex viscosity equal to or higher than a certain value. The maximum value ($\eta_{max}$) of the complex viscosity of the elastomer composition is preferably 5 Pa·s or more, more preferably 10 Pa·s or more.

It is preferable that the complex viscosity do not greatly vary in the frequency range of from 1 Hz to 50 Hz. The complex viscosity of the elastomer composition obtained by dynamic viscoelasticity measurement at a temperature of 200° C. is preferably such that the ratio ($\eta_{max}/\eta_{min}$) between the maximum value ($\eta_{max}$) and the minimum value ($\eta_{min}$) in the frequency range of from 1 Hz to 50 Hz be 10 or less. The ratio ($\eta_{max}/\eta_{min}$) is more preferably 8 or less, still more preferably 6 or less.

It is preferable that a loss tangent obtained by dynamic viscoelasticity measurement at a temperature of 200° C. of the elastomer composition show a certain value. The loss tangent is a characteristic value that is also referred to as "Tan δ" and obtained by calculating the ratio (G"/G') of a loss elastic modulus (G") to a storage elastic modulus (G').

The higher the loss tangent is, the more likely the elastomer composition exhibits liquid characteristics in the injection molding. That is, the higher the loss tangent is, the more the elastomer composition can smoothly move along the molding surface of the forming mold in the injection molding. Thus, the effect of suppressing fine wrinkles formed on the surface of the injection molded article can be enhanced.

The maximum value of the loss tangent of the elastomer composition in the frequency range of from 1 Hz to 50 Hz is preferably 1 or more. The maximum value of the loss tangent is more preferably 1.2 or more, still more preferably 1.5 or more, particularly preferably 2 or more. In general, the maximum value of the loss tangent of the elastomer composition is 1,000 or less.

The range in which the value of the loss tangent exceeds the maximum value extends preferably over 10% or more of the frequency range of from 1 Hz to 50 Hz. That is, the value of the loss tangent is preferably such that the loss tangent exceeds the maximum value over a 5 Hz or more range in the frequency range of from 1 Hz to 50 Hz. The range in which the value of the loss tangent exceeds the maximum value extends more preferably over 5% or more of the frequency range of from 1 Hz to 50 Hz, still more preferably over 50% or more of the frequency range of from 1 Hz to 50 Hz. The loss tangent exceeds the maximum value particularly preferably throughout the frequency range of from 1 Hz to 50 Hz.

It is preferable that the value of the loss tangent do not greatly vary in the frequency range of from 1 Hz to 50 Hz. The value of the loss tangent of the elastomer composition obtained by dynamic viscoelasticity measurement at a temperature of 200° C. is preferably such that the ratio ($R_{max}/R_{min}$) between the maximum value ($R_{max}$) and the minimum value ($R_{min}$) in the frequency range of from 1 Hz to 50 Hz be preferably 10 or less. The ratio ($R_{max}/R_{min}$) is more preferably 8 or less, still more preferably 6 or less.

The complex viscosity and the loss tangent of the elastomer composition at 200° C. can be obtained based on JIS K 7244-6 "Plastics-Determination of dynamic mechanical properties—Part 6: Shear vibration—Non-resonance method". Specifically, the measurement can be made using a dynamic viscoelasticity measuring instrument (product name "MCR-302" manufactured by Anton Paar GmbH). Measurement can be made with a parallel plate-shaped sample having a diameter of 25 mm under the following measurement conditions.

<Measurement Conditions>
Measurement mode: Tensile mode of a sinusoidal strain
Frequency: from 1 Hz to 50 Hz
Load: Automatic static load
Dynamic strain: 10%
Measurement temperature: Given conditions in every measurement The elastomer composition of this embodiment includes a styrene-based thermoplastic elastomer and a plasticizer. The elastomer composition may include only one styrene-based thermoplastic elastomer, or may include two or more styrene-based thermoplastic elastomers. The elastomer composition may include only a plasticizer, or may include two or more plasticizers.

The styrene-based thermoplastic elastomer included in the elastomer composition is preferably a block polymer including a soft segment and hard segments at both terminals of the soft segment in a molecular structure. That is, the styrene-based thermoplastic elastomer preferably has a triblock structure including a soft segment composed of a polyolefin block or the like and a hard segment composed of a polystyrene block or the like, in which the hard segment, the soft segment, and the hard segment are aligned in this order.

In the styrene-based thermoplastic elastomer having such a triblock structure, high intermolecular forces are exerted between the hard segments of each adjacent molecules to form a pseudo-crosslinked structure that allows each soft segment present between the crosslinking points by the pseudo-crosslinked structure to retain the plasticizer. The elastomer composition of this embodiment may include a styrene-based thermoplastic elastomer having a diblock structure, while including the block polymer having a triblock structure.

Examples of the styrene-based thermoplastic elastomer of this embodiment include: a styrene-based thermoplastic elastomer having a diblock structure such as styrene-ethylene/butylene copolymer (SEB), or styrene-ethylene/propylene copolymer (SEP); and a styrene-based thermoplastic elastomer having a triblock structure such as styrene-butadiene-styrene copolymer (SBS), styrene-isoprene-styrene copolymer (SIS), styrene-ethylene/butylene-styrene copolymer (SEBS), styrene-ethylene/propylene-styrene copolymer (SEPS), styrene-ethylene/ethylene/propylene-styrene copolymer (SEEPS), or styrene-butadiene/butylene-styrene copolymer (SBBS).

As described above, the styrene-based thermoplastic elastomer having a triblock structure is suitable as the styrene-based thermoplastic elastomer included in the elastomer composition of this embodiment. Among the styrene-based thermoplastic elastomers having a triblock structure, a block polymer having a mass average molecular weight of 300,000 or more is suitable as the styrene-based thermoplastic elastomer included in the elastomer composition since the block polymer is appropriate to allow the elastomer composition to exhibit the melting characteristics suitable for the injection molding. The styrene-based thermoplastic elastomer having such a high-molecular weight has a soft segment having a long chain length and is excellent in the ability of retaining the plasticizer. By including the styrene-based thermoplastic elastomer having such a high-molecular weight, a likelihood of causing bleeding out of the plasticizer from the first cushioning part 51 and the second cushioning part 52 can be reduced. Accordingly, the range of selection of the type, the content, or the like of the plasticizer can be widened by including the styrene-based thermoplastic elastomer having such a high-molecular weight in the elastomer composition.

The styrene-based thermoplastic elastomer having a triblock structure may be a tetrablock polymer having a structure in an alternating hard-soft-hard-soft configuration or a multiblock polymer having five or more of blocks in total with alternating hard segments and soft segments; however, is preferably a triblock polymer having a molecule chain, both terminals of which are hard segments, with only one soft segment sandwiched between the hard segments.

In order to enable easy adjustment of the mechanical strength of the first cushioning part 51 and the second cushioning part 52, a styrene-based thermoplastic elastomer other than the styrene-based thermoplastic elastomer having a high-molecular weight is preferably included in the elastomer composition. That is, the elastomer composition preferably includes both a first styrene-based thermoplastic elastomer (TPS1), which is a high-molecular weight block polymer having a triblock structure, and a second styrene-based thermoplastic elastomer (TPS2).

The second styrene-based thermoplastic elastomer (TPS2) preferably has a mass average molecular weight of 200,000 or less. The second styrene-based thermoplastic elastomer (TPS2) preferably has a triblock structure.

The mass average molecular weight of the first styrene-based thermoplastic elastomer (TPS1) is more preferably 550,000 or less, still more preferably 500,000 or less, particularly preferably 450,000 or less. The mass average molecular weight of the second styrene-based thermoplastic elastomer (TPS2) is more preferably 50,000 or more, still more preferably 70,000 or more, particularly preferably 90,000 or more.

The mass average molecular weight of the styrene-based thermoplastic elastomer can be obtained as follows. The mass average molecular weight (Mw) can be obtained as a standard-polystyrene-equivalent molecular weight by gel permeation chromatography (GPC). The measurement instrument and conditions can be adopted as follows:

Instrument: GPC instrument "HLC-8320GPC" manufactured by Tosoh Corporation

Separation column: "TSKgel SuperHM-H" manufactured by Tosoh Corporation

Detector: "RI-8320" manufactured by Tosoh Corporation

Eluent: Tetrahydrofuran

Eluent flow rate: 0.6 mL/min

Sample concentration: 3 mg/3 mL

Column temperature: 40° C.

The first styrene-based thermoplastic elastomer (TPS1) is preferably any one of styrene-ethylene/butylene-styrene copolymer (SEBS), styrene-ethylene/propylene-styrene copolymer (SEPS), and styrene-ethylene/ethylene/propylene-styrene copolymer (SEEPS).

The higher the styrene content of the first styrene-based thermoplastic elastomer (TPS1), the stronger the pseudo-crosslinked structure. Therefore, the styrene content of the first styrene-based thermoplastic elastomer (TPS1) is preferably 20 mass % or more, more preferably 25 mass % or more. Meanwhile, the fact that the styrene content is high indicates that the content of the soft segment effective to retain the plasticizer is small. Therefore, the styrene content of the first styrene-based thermoplastic elastomer (TPS1) is preferably 50 mass % or less, more preferably 40 mass % or less.

The second styrene-based thermoplastic elastomer (TPS2) is preferably any one of styrene-ethylene/butylene-styrene copolymer (SEBS), styrene-ethylene/propylene-styrene copolymer (SEPS), and styrene-ethylene/ethylene/propylene-styrene copolymer (SEEPS).

Each of the first styrene-based thermoplastic elastomer (TPS1) and the second styrene-based thermoplastic elastomer (TPS2) is preferably styrene-ethylene/ethylene/propylene-styrene copolymer (SEEPS).

For the same reason as the first styrene-based thermoplastic elastomer (TPS1), the styrene content of the second styrene-based thermoplastic elastomer (TPS2) is preferably 20 mass % or more, more preferably 25 mass % or more. Also, the styrene content of the second styrene-based thermoplastic elastomer (TPS2) is preferably 50 mass % or less, more preferably 40 mass % or less.

Two or more styrene-based thermoplastic elastomers may be included in the elastomer composition. Examples of the styrene-based thermoplastic elastomer include styrene-based thermoplastic elastomer (TPSx) having a styrene content of 60 mass % or more and 70 mass % or less, amine-modified styrene-based thermoplastic elastomer (TPSy), and maleic anhydride-modified styrene-based thermoplastic elastomer (TPSz). Each of the styrene-based thermoplastic elastomers (TPSx to TPSz) preferably has a mass average molecular weight of 30,000 or more and 200,000 or less.

The elastomer composition may include, in addition to the aforementioned styrene-based thermoplastic elastomers, a styrene-based resin such as polystyrene, an acrylonitrile styrene resin (AS resin), and an acrylonitrile butadiene styrene resin (ABS resin).

The elastomer composition may include: an olefin-based polymer such as an olefin-based elastomer or an olefin-based resin; an amide-based polymer such as an amide-based elastomer or an amide-based resin; an ester-based polymer such as an ester-based elastomer or an ester-based resin; or a urethane-based elastomer or a urethane-based resin.

Examples of the olefin-based polymer include polyolefins of polyethylene (for example, linear low-density polyethylene (LLDPE) and high density polyethylene (HDPE)) and polypropylene, and polyolefins of ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylate copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylate copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), and propylene-vinyl acetate copolymer.

Among the olefin-based polymers, polypropylene effectively acts on the elastomer composition to exhibit high fluidity during the injection molding. Among polypropylenes, polypropylene (r-PP) which is a random copolymer of ethylene and propylene is particularly excellent in the aforementioned effect compared with polypropylene (h-PP) which is a homo polymer of propylene or polypropylene (b-PP) which is a block copolymer of ethylene and propylene. Thus, a small amount of polypropylene (r-PP), which is a random copolymer, may be included in the elastomer composition. The content of the polypropylene (r-PP) in the elastomer composition is preferably more than 0 mass parts and 5 mass parts or less when the content of the styrene-based elastomer is 100 mass parts.

The polymer may be, for example, an amide-based polymer such as an amide-based elastomer or an amide-based resin. Examples of the amide-based polymer include polyamide 6, polyamide 11, polyamide 12, polyamide 66, and polyamide 610.

The polymer may be, for example, an ester-based polymer such as an ester-based elastomer or an ester-based resin. Examples of the ester-based polymer include polyethylene terephthalate and polybutylene terephthalate.

Examples of the urethane-based polymer include polyester-based polyurethane and polyether-based polyurethane.

The characteristics such as mechanical strength can be improved by including a polymer other than the styrene-based thermoplastic elastomers in the elastomer composition. However, inclusion of the other polymer in the elastomer composition may cause deterioration of the characteristics such as mechanical strength, or deterioration of the transparency of the elastomer composition. Accordingly, the ratio of the styrene-based thermoplastic elastomers to the total amount of the polymer included in the elastomer composition of this embodiment is preferably 80 mass % or more. The ratio is more preferably 85 mass % or more, still more preferably 90 mass % or more, particularly preferably 95 mass % or more. It is the most preferable that the polymers included in the elastomer composition be substantially only the styrene-based thermoplastic elastomers.

The ratio of the first styrene-based thermoplastic elastomer (TPS1) to the total amount of the styrene-based thermoplastic elastomers included in the elastomer composition is preferably 20 mass % or more, more preferably 25 mass % or more. This ratio is preferably 50 mass % or less, more preferably 45 mass % or less, still more preferably 40 mass % or less. That is, the ratio of the first styrene-based thermoplastic elastomer (TPS1) to the total amount of the styrene-based thermoplastic elastomers included in the elastomer composition is preferably 20 mass % or more and 50 mass % or less.

The ratio of the second styrene-based thermoplastic elastomer (TPS2) to the total amount of the styrene-based thermoplastic elastomers included in the elastomer composition is preferably 50 mass % or more, more preferably 55 mass % or more. This ratio is preferably 80 mass % or less, more preferably 75 mass % or less. That is, the ratio of the second styrene-based thermoplastic elastomer (TPS2) to the total amount of the styrene-based thermoplastic elastomers included in the elastomer composition is preferably 50 mass % or more and 80 mass % or less.

As seen from the above, it is preferable that the first styrene-based thermoplastic elastomer (TPS1) and the second styrene-based thermoplastic elastomer (TPS2) be included in the elastomer composition so that the mass ratio (TPS1:TPS2) is in the range of 20:80 to 50:50.

Examples of the plasticizer included in the elastomer composition along with the styrene-based thermoplastic elastomer include: hydrocarbons such as paraffin oil, paraffin wax, naphthene oil, aromatic oil, polybutadiene, or polybutene; epoxidized oils such as epoxidized soy oil or epoxidized flaxseed oil; esters such as carboxylic acid ester, phosphoric acid ester, or sulfonic acid ester; and higher alcohols such as oleyl alcohol or stearyl alcohol.

The kinetic viscosity at 40° C. of the plasticizer is preferably 50 $mm^2/s$ or more, more preferably 60 $mm^2/s$ or more, still more preferably 70 $mm^2/s$ or more. The kinetic viscosity at 40° C. of the plasticizer is preferably 500 $mm^2/s$ or less, more preferably 450 $mm^2/s$ or less, still more preferably 420 $mm^2/s$ or less. The kinetic viscosity at 40° C. of the plasticizer is preferably 50 $mm^2/s$ or more and 500 $mm^2/s$ or less.

When the elastomer composition includes a plurality of plasticizers, the plurality of plasticizers is preferably mixed to show the aforementioned kinetic viscosity in a mixture state.

The kinetic viscosity of the plasticizer can be obtained according to JIS K2283 "Crude petroleum and petroleum products—Determination of kinematic viscosity and calculation of viscosity index from kinematic viscosity".

When the total amount of the styrene-based thermoplastic elastomers included in the elastomer composition is 100 mass parts, the content of the plasticizer in the elastomer composition is preferably 100 mass parts or more, more preferably 150 mass parts or more, still more preferably 200 mass parts or more, particularly preferably 250 mass parts or more. The content of the plasticizer is preferably 500 mass parts or less. That is, the content of the plasticizer is preferably 100 mass parts or more and 500 mass parts or less, more preferably 150 mass parts or more and 500 mass parts or less, still more preferably 200 mass parts or more and 500 mass parts or less, particularly preferably 250 mass parts or more and 500 mass parts or less.

The plasticizer is preferably paraffin oil since the elastomer composition exhibits excellent transparency. In particular, the plasticizer is preferably paraffin oil having a mass average molecular weight of 500 or more and 2,500 or less. The mass average molecular weight of the paraffin oil is more preferably 1,000 or more, still more preferably 1,300 or more. In the elastomer composition, it is preferable that a first paraffin oil having a mass average molecular weight of 1,300 or more and 2,500 or less and a second paraffin oil having a mass average molecular weight of 500 or more and 1,200 and less be mixed together for use. It is preferable that the first paraffin oil (P1) and the second paraffin oil (P2) be included in the elastomer composition so that the mass ratio (P1:P2) is 1:2 to 2:1.

The mass average molecular weight of the oil can be obtained using GPC in the manner as mentioned below. The column "TSKgel, SuperHM-H (6.0 mm ID×15 cm manufactured by Tohso Corporation)" is used, and THF (tetrahydrofuran) is used as eluent. The measurement is made under the measurement conditions with a sample concentration of 0.02 mass %, a flow rate of 0.6 mL/min, a sample injection amount of 100 μL, and a measurement temperature at 40° C., using an IR detector. The mass average molecular weight of the oil can be obtained as polystyrene-equivalent value based on the calibration curve obtained by the standard polystyrene.

In the elastomer composition, a crosslinking agent for crosslinking the elastomer may be included as needed. As the crosslinking agent, for example, an organic peroxide, a maleimide-based crosslinking agent, a sulfur, phenol-based crosslinking agent, oximes, a polyamine, or the like can be employed. Further, the elastomer may be crosslinked by irradiation of an electron beam or an X-ray.

Examples of the organic peroxide include dicumyl peroxide, di-t-butyl peroxide, 2,5-dimethyl-2,5-di-(t-butylperoxy)hexane, 2,5-dimethyl-2,5-di-(t-butylperoxy)hexane-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, and t-butylcumyl peroxide. The elastomer composition may include solely a single crosslinking agent such as one described above, or may include a plurality of crosslinking agents.

In the elastomer composition, an inorganic filler such as clay, talc, or silica may be further included. The inorganic filler included in the elastomer composition may be metal foil, glass flakes, pearl mica, or the like having light reflection properties. The elastomer composition may include solely a single inorganic filler such as one described above, or may include a plurality of inorganic fillers. Since the smooth surfaces of the first cushioning part 51 and the second cushioning part 52 of this embodiment are less likely to cause irregular reflection of light, the light from the outside can easily reach the inorganic filler and the reflected light on the inorganic filler is easily visible by including the inorganic filler having such light reflection properties. That is, the first cushioning part 51 and the second cushioning part 52 of this embodiment are allowed to exhibit excellent appearance by including the light reflective inorganic filler.

The elastomer composition may include an organic filler such as cellulose nanofibers and aramid fibers. Further, as the organic filler, colorful plastic beads may be included in the first cushioning part 51 and the second cushioning part 52 of this embodiment.

In the elastomer composition, one or two or more selected from among, for example, a processing aid, a weather-proof agent, a flame retardant, a pigment, a mold releasing agent, an electrostatic preventing agent, an antimicrobial agent, and a deodorizer.

The first cushioning part 51 and the second cushioning part 52 can be produced using forming molds respectively having shapes corresponding to the overall shapes of these cushioning parts. As a method for forming the elastomer composition into the injection molded article to be served as the first cushioning part 51 or the second cushioning part 52, a general injection molding method can be employed, and a method of injecting a heated and molten elastomer into a cavity of a forming mold can be employed.

Figure 3A:
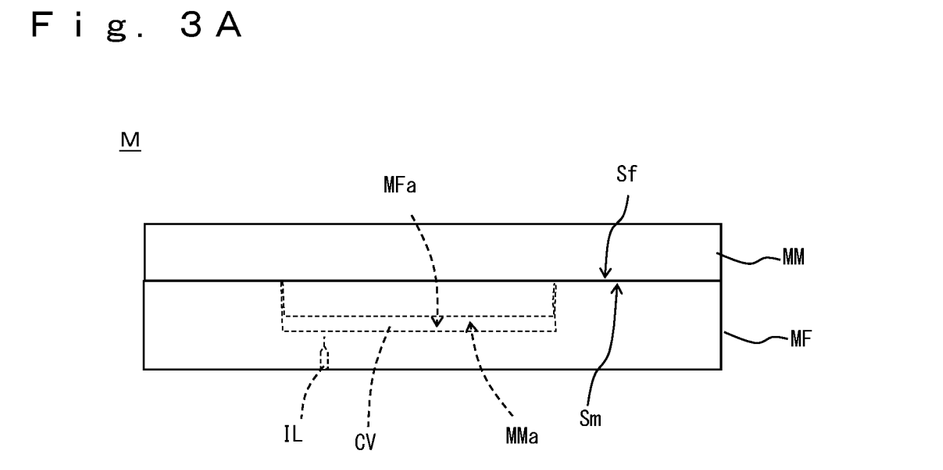
FIG. 3A is a schematic front view of a forming mold for producing a shoe part according to one embodiment.
Figure 3B:
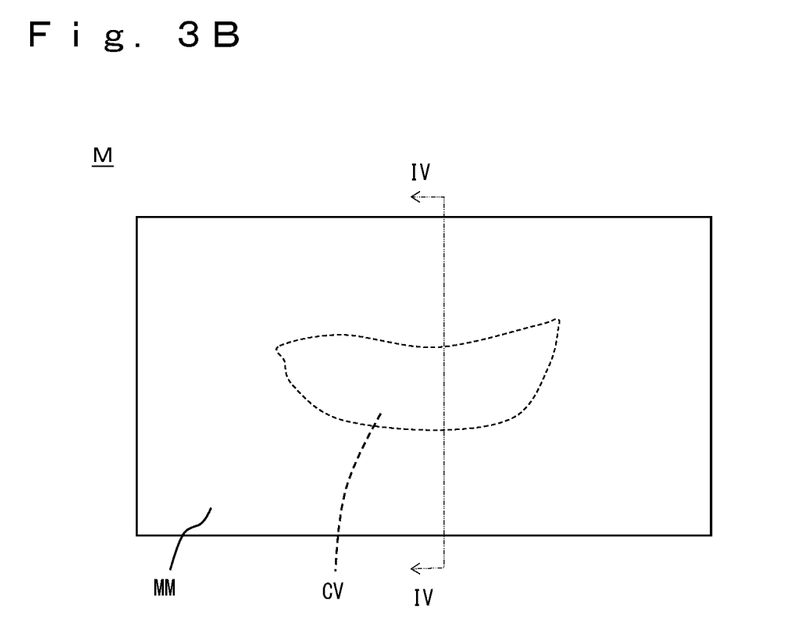
FIG. 3B is a schematic plan view of the forming mold for producing the shoe part according to the one embodiment.
Figure 3C:
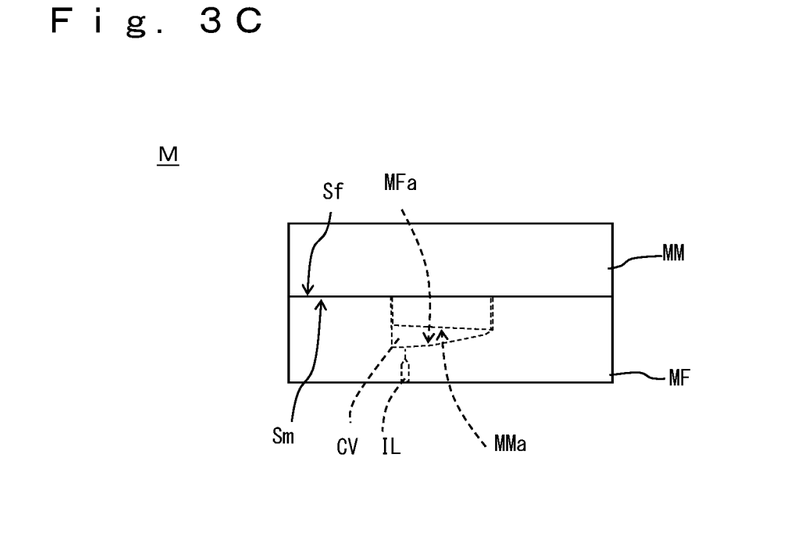
FIG. 3C is a schematic side view of the forming mold for producing the shoe part according to the one embodiment.

When a shoe part such as the first cushioning part 51 and the second cushioning part 52 is produced by injection molding, a forming mold M as shown in, for example, FIG. 3A, FIG. 3B, and FIG. 3C, is used. The forming mold M shown in the figures is a forming mold used for producing the second cushioning part 52. The forming mold M is composed of a pair of molds respectively having mating surfaces Sf, Sm that contact each other when the mold is closed. The forming mold M has a male mold MM and a female mold MF as the pair of molds. The forming mold M is configured to be able to form a closed cavity CV inside the forming mold by mating the male mold MM with the female mold MF. In the male mold MM of this embodiment, a molding surface MMa defining the cavity CV is a smooth surface without being subjected to the mat treatment or the hairline treatment. Also in the female mold MF, a molding surface MFa defining the cavity CV is a smooth surface without being subjected to mat treatment or hairline treatment.

Figure 4:
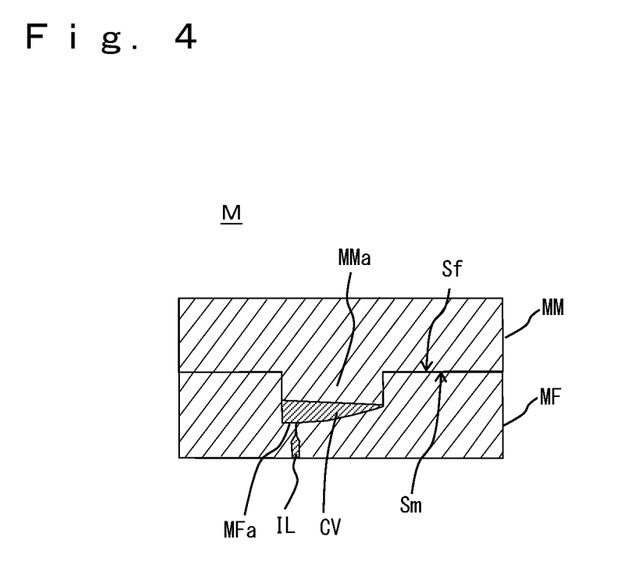

The forming mold M includes an inlet IL for introducing a polymer composition from an injection molding machine, in which the polymer composition is molten and kneaded, to the cavity CV. In the injection molding using the forming mold M, the elastomer composition injected from the inlet IL into the cavity CV is filled in the entire cavity CV while being cooled by the molding surfaces (MMa, MFa). At this time, the injection molded article produced in this embodiment is unlikely to form fine wrinkles on the surface because the elastomer composition has the aforementioned melting characteristics (the viscosity and the loss tangent), thereby smoothly flowing along the molding surfaces. Therefore, the surface of the injection molded article produced in this embodiment can faithfully reflect the surface characteristics of the molding surfaces. That is, the injection molded article in this embodiment can be produced to have a smooth surface.

The faithful reflection of the surface characteristics of the molding surface is also realized in the case where the molding surface is subjected to hairline treatment or mat treatment.

The description of this embodiment is merely an example. This embodiment is described by taking, for example, the shoe provided with a plurality of midsoles including the first midsole and the second midsole layered in the vertical direction, but the midsole provided in the shoe sole of the present invention may be composed of one layer or three or more layers. Further, this embodiment is described by taking, for example, the shoe that has the cushioning parts sandwiched between the first midsole and the second midsole, but the cushioning parts may be provided between the midsole and the outsole or between the midsole and the upper. Moreover, the cushioning parts may be arranged to be embedded in recesses formed in the midsole.

This embodiment is described by taking, for example, the case where the injection molded article is used as the cushioning part, but the injection molded article of this embodiment may be used for a shoe part for other purposes than the cushioning purpose. Further, this embodiment is described by taking, for example, the case where the injection molded article is used as the shoe part, but the intended use of the injection molded article of this embodiment is not limited to the shoe part. That is, the injection molded article and the shoe according to the present invention are not limited to the aforementioned exemplification.

EXAMPLES

Next, the present invention will be described in more detail with reference to test examples, but not limited thereto.

Reference Examples 1 and 2, Examples 1 to 7, and Comparative Examples 1 to 9

(First Styrene-Based Thermoplastic Elastomer)

Three different first styrene-based thermoplastic elastomers having a mass average molecular weight of 300,000 or more were prepared as follows:

TPS1-a: SEEPS having a mass average molecular weight of 300,000 and a styrene content of 30 mass %;

TPS1-b: SEEPS having a mass average molecular weight of 400,000 and a styrene content of 30 mass %; and TPS1-c: SEEPS having a mass average molecular weight of 450,000 and a styrene content of 30 mass %.

(Second Styrene-Based Thermoplastic Elastomer)

As a second styrene-based thermoplastic elastomer having a mass average molecular weight of 200,000 or less, the following was prepared:

TPS2: SEEPS having a mass average molecular weight of 100,000 and a styrene content of 30 mass %.

(Plasticizer)

As a plasticizer, two different paraffin oils were prepared as follows:

P1: Paraffin oil having a mass average molecular weight of approximately 900 and a kinetic viscosity at 40° C. of approximately 91 mm$^2$/s; and P2: Paraffin oil having a mass average molecular weight of approximately 1,400 and a kinetic viscosity at 40° C. of approximately 409 mm$^2$/s.

(Preparation of Elastomer Composition)

An elastomer composition was prepared by melting and kneading the aforementioned styrene-based thermoplastic elastomers and plasticizers with blending amounts described later in Table 1 and Table 2.

(Production of Injection Molded Article)

A forming mold having a flat plate-shaped cavity having a thickness of 4 mm was prepared. Each of the heated and molten elastomer compositions was injected into the cavity of the forming mold to produce a plate-shaped injection molded article having a thickness of 4 mm.

<Evaluation 1: Heat Melting Characteristics>

A complex viscosity and a loss tangent at 200° C. of each of the elastomer compositions was measured by performing dynamic viscoelasticity measurement. From the obtained results, the maximum value ($\eta_{max}$) of the complex viscosity in the frequency range of from 1 Hz to 50 Hz and the maximum value (tan $\delta_{max}$) of the loss tangent in the frequency range of from 1 Hz to 50 Hz were calculated.

<Evaluation 2: Surface Characteristics>

The haze (haze blank) of each of the injection molded articles was measured. Subsequently, two pieces of a polyethylene terephthalate film (having a thickness of 50 µm) having a sufficiently smooth surface and excellent transparency were prepared, followed by sandwiching each of the injection molded articles between the two pieces of the polyethylene terephthalate film to be subjected to hot pressing, thereby producing plate-shaped samples each having a thickness of 4 mm in which the polyethylene terephthalate film was adhered to the surface of the injection molded article, while the surface of the injection molded article was smoothened by the polyethylene terephthalate film. The haze (haze cure) of each of the plate-shaped samples was measured. The difference (ΔHaze=Haze blank−Haze cure) between the haze (haze blank) before hot pressing and the haze (haze cure) after hot pressing was calculated to evaluate the degree of improvement in surface smoothness by hot pressing. That is, the injection molded article showing a low degree of improvement effect by hot pressing was originally in good conditions, that is, had a smooth surface without fine wrinkles on the surface. Therefore, the surface characteristics of each of the injection molded articles was evaluated based on the difference between the hazes. The results are shown in Table 1 and Table 2 below.

TABLE 1

| | Grade | $M_W$ (×10$^3$) | Ref. Ex. 1 | Ref. Ex. 2 | Ex. 1 | Ex. 2 | Ex. 3 | Ex. 4 | Ex. 5 | Ex. 6 | Ex. 7 |
|---|---|---|---|---|---|---|---|---|---|---|---|
| TPS | TPS2 | 100 | 100 | 100 | 80 | 60 | 80 | 60 | 80 | 80 | 60 |
| | TPS1-a | 300 | | | 20 | 40 | | | | | |
| | TPS1-b | 400 | | | | | 20 | 40 | | 20 | 40 |
| | TPS1-c | 450 | | | | | | | 20 | | |
| Plasticizer | P1 | 0.9 | 300 | | 300 | 300 | 300 | 300 | 300 | | |
| | P2 | 1.4 | | 300 | | | | | | 300 | 300 |
| | Total | | 400 | 400 | 400 | 400 | 400 | 400 | 400 | 400 | 400 |
| Transparency | Haze blank | % | 9 | 5 | 21 | 33 | 14 | 36 | 24 | 25 | 44 |
| | Haze cure | % | 9 | 5 | 12 | 21 | 10 | 14 | 11 | 12 | 16 |
| | ΔHaze | % | 0 | 0 | 9 | 12 | 4 | 22 | 13 | 13 | 28 |
| Melting characteristics (at 200° C.) | $\eta^*_{Max, 1\text{-}50\ Hz}$ | Pa * s | 1.79 | 6.47 | 26.1 | 134 | 26.3 | 492 | 18.6 | 22.3 | 307 |
| | tan$\delta_{Max, 1\text{-}50\ Hz}$ | — | 181 | 730 | 1.71 | 1.96 | 2.04 | 1.27 | 2.80 | 3.70 | 1.01 |
| | Hardness ASKER-C | deg. | 23 | 24 | 22 | 22 | 21 | 20 | 20 | 23 | 23 |
| | Tensile strength $T_B$ | MPa | 0.87 | 1.8 | 1.4 | 1.4 | 1.5 | 1.2 | 0.90 | 1.5 | 0.46 |
| | Tear strength $T_S$ | N/mm | 3.6 | 4.9 | 5.4 | 8.8 | 4.4 | 5.6 | 3.5 | 4.2 | 5.3 |

TABLE 2

| Type | Grade | $M_W$ (×10^3) | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|---|
| TPS | TPS2 | 100 | 40 | | 40 | | 60 | 40 | | 40 | |
| | TPS1-a | 300 | 60 | 100 | | | | | | | |
| | TPS1-b | 400 | | | 60 | 100 | | | | 60 | 100 |
| | TPS1-c | 450 | | | | | 40 | 60 | 100 | | |
| Plasticizer | P1 | 0.9 | 300 | 300 | 300 | 300 | 300 | 300 | 300 | | |
| | P2 | 1.4 | | | | | | | | 300 | 300 |
| | Total | | 400 | 400 | 400 | 400 | 400 | 400 | 400 | 400 | 400 |
| Transparency | Haze blank | % | 90 | 96 | 89 | 96 | 49 | 78 | 95 | 91 | 95 |
| | Haze cure | % | 31 | 26 | 22 | 28 | 15 | 19 | 33 | 42 | 34 |
| | ΔHaze | % | 59 | 70 | 67 | 68 | 34 | 59 | 62 | 49 | 61 |
| Melting characteristics (at 200° C.) | $\eta^*_{Max,\ 1\text{-}50\ Hz}$ | Pa·s | 1590 | 6290 | 2410 | 7550 | 212 | 1790 | 8680 | 2500 | 8590 |
| | $\tan\delta_{Max,\ 1\text{-}50\ Hz}$ | — | | 0.75 | 0.42 | 0.36 | 0.15 | 0.65 | 0.42 | 0.13 | 0.37 | 0.13 |
| Hardness | ASKER-C | deg. | 21 | 18 | 20 | 18 | 20 | 20 | 18 | 23 | 19 |
| Tensile strength | $T_B$ | MPa | 1.3 | 1.2 | 1.3 | 0.59 | 1.0 | 0.79 | 0.44 | 1.2 | 0.31 |
| Tear strength | $T_S$ | N/mm | 9.5 | 6.7 | 7.2 | 3.4 | 3.8 | 4.9 | 2.9 | 6.1 | 2.0 |

The above Tables reveal that the injection molded articles formed using the elastomer compositions showing certain melting characteristics at 200° C. have a low degree of haze improvement effect by hot pressing and are originally excellent in surface characteristics.

REFERENCE SIGNS LIST

1: Shoe
2: Upper
3: Midsole
4: Outsole
5: Cushioning part (injection molded article)

The invention claimed is:

1. An injection molded article composed of an elastomer composition comprising one or more styrene-based thermoplastic elastomers and a plasticizer, wherein
the elastomer composition has a maximum value of viscosity of 10,000 Pa·s or less obtained by dynamic viscoelasticity measurement at a temperature of 200° C. in a frequency range of from 1 Hz to 50 Hz,
the elastomer composition has a maximum value of loss tangent of 1 or more obtained by dynamic viscoelasticity measurement at 200° C. in a frequency range of from 1 Hz to 50 Hz,
at least one of the one or more styrene-based thermoplastic elastomers of the elastomer composition is a block polymer that comprises a soft segment and hard segments at both terminals of the soft segment in a molecular structure, and
the block polymer has a mass average molecular weight of 300,000 or more.

2. The injection molded article according to claim 1, wherein
a content of the plasticizer in the elastomer composition is from 100 mass parts to 500 mass parts based on 100 mass parts of the one or more styrene-based thermoplastic elastomers.

3. The injection molded article according to claim 1, wherein
the one or more styrene-based thermoplastic elastomers comprise two styrene-based thermoplastic elastomers, a first styrene-based thermoplastic elastomer of the two styrene-based thermoplastic elastomers is the block polymer, and
a second styrene-based thermoplastic elastomer of the two styrene-based thermoplastic elastomers has a mass average molecular weight of 200,000 or less.

4. The injection molded article according to claim 1, wherein
the block polymer is a triblock polymer.

5. The injection molded article according to claim 1, wherein
the elastomer composition has a haze value of 30% or less when the elastomer composition has a thickness of 4 mm.

6. A shoe composed of a plurality of shoe parts, wherein at least one of the plurality of shoe parts is the injection molded article according to claim 1.

7. The injection molded article according to claim 2, wherein
the one or more styrene-based thermoplastic elastomers comprise two styrene-based thermoplastic elastomers, a first styrene-based thermoplastic elastomer of the two styrene-based thermoplastic elastomers is the block polymer, and
a second styrene-based thermoplastic elastomer of the two styrene-based thermoplastic elastomers has a mass average molecular weight of 200,000 or less.

8. The injection molded article according to claim 2, wherein
the block polymer is a triblock polymer.

9. The injection molded article according to claim 3, wherein
the block polymer is a triblock polymer.

10. The injection molded article according to claim 2, wherein
the elastomer composition has a haze value of 30% or less when the elastomer composition has a thickness of 4 mm.

11. The injection molded article according to claim 3, wherein
the elastomer composition has a haze value of 30% or less when the elastomer composition has a thickness of 4 mm.

12. The injection molded article according to claim 4, wherein
   the elastomer composition has a haze value of 30% or less when the elastomer composition has a thickness of 4 mm.

13. The injection molded article according to claim 7, wherein
   the elastomer composition has a haze value of 30% or less when the elastomer composition has a thickness of 4 mm.

14. The injection molded article according to claim 8, wherein
   the elastomer composition has a haze value of 30% or less when the elastomer composition has a thickness of 4 mm.

15. The injection molded article according to claim 9, wherein
   the elastomer composition has a haze value of 30% or less when the elastomer composition has a thickness of 4 mm.

\* \* \* \* \*